July 26, 1960
J. I. O'NEAL
2,946,404
FLANGE LUBRICATOR
Filed Dec. 15, 1955
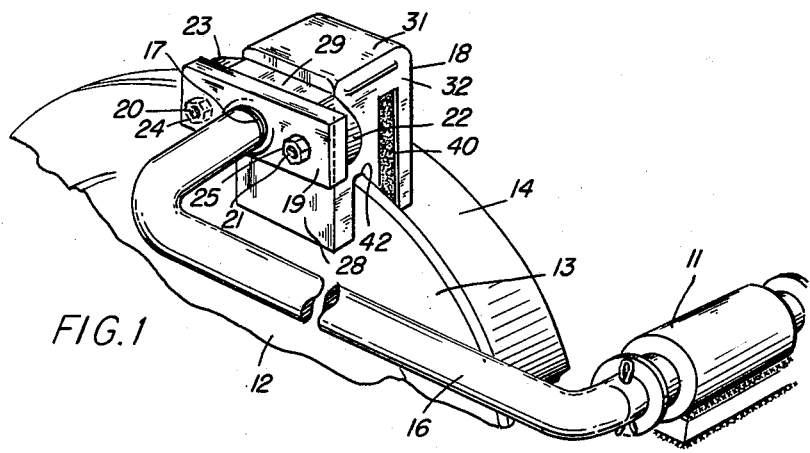
FIG.1
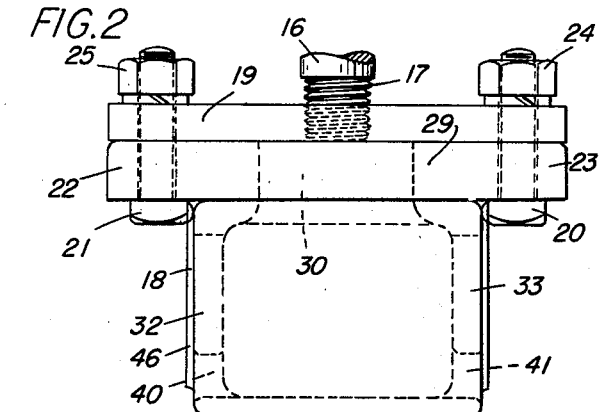
FIG.2
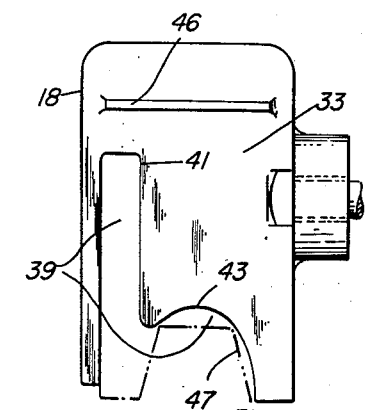
FIG.3
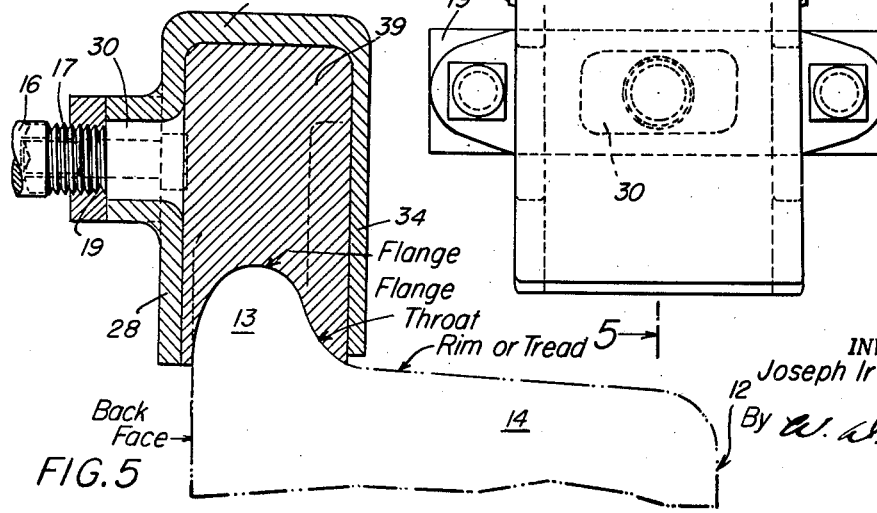
FIG.4
FIG.5
INVENTOR.
Joseph Irving O'Neal
By W. D. Keith
Attorney – # United States Patent Office 2,946,404
Patented July 26, 1960

2,946,404
FLANGE LUBRICATOR

Joseph Irving O'Neal, New York, N.Y., assignor, by mesne assignments, to Wegner Machinery Corporation, Long Island City, N.Y., a corporation of New York Filed Dec. 15, 1955, Ser. No. 553,309

6 Claims. (Cl. 184—3)

This invention is concerned with a railroad wheel flange lubricating shoe. More specifically, a wheel flange lubricating shoe according to this invention, is one that employs a solid lubricant and has an arrangement for accurately controlling the amount of deposit of lubricant while extending the life of the lubricator to a maximum.

Heretofore, various wheel flange lubrication arrangements have been proposed, the great majority of these being lubricators which made use of oil or grease. The use of this type of lubricant on a railroad wheel flange, has been found to have great draw-backs in that it is extremely difficult to control the lubrication under the various conditions met in service. For example, it was found that oil or grease would tend ot seep or otherwise become applied to the main driving surface or tread of the wheel.

In view of the above, it is an object of this invention to provide a flange lubricating shoe that is very simple, yet extremely effective in lubricating driving wheel flanges for the prevention of excessive cutting and wear of the flanges, as well as the track rails, frogs and switches.

Another object of this invention is to provide a flange lubricating shoe which acts to apply lubricant on the flange alone, so that no lubrication of the tread of the wheel inadvertently takes place.

Another object of the invention is to provide a flange lubricating shoe wherein use is made of a solid lubricant that is carried by a relatively long-wearing housing material. Then by proper arrangement and determination of the thickness of the housing walls, the lubricator controls the thickness of the lubricating film applied, by reason of the rapidity with which the housing wears away.

A further object of this invention is to provide a wheel flange lubricating shoe that is very effective in both extremely dry and extremely moist atmospheres.

It may be noted that although solid lubricant has been employed heretofore for lubricating railroad wheel flanges, such lubricators have various draw-backs which are overcome by reason of this invention. Among the draw-backs in the prior arrangements are the fact that the lubrication was applied only to the flange throat and the adjacent side of the flange. In addition, the prior arrangements have been such that a stick of solid lubricant was spring biased mainly against the wheel flange throat. Then, by reason of the amount of relative motion which takes place between the wheel and its mounting in any railroad vehicle, the stick of lubricant would often become dislodged and thus be forcibly ejected from its holder, leaving the lubricator completely disabled.

On the other hand, the lubricating shoe according to this invention has a block of solid lubricant press-fitted securely into a cast iron housing, so that there is no possibility of the lubricant falling out of its housing support. Furthermore, the arrangement is such that the housing supports the block of lubricant straddling the wheel flange in a manner so as to lubricate both the inside and outside of the flange, while at the same time accurately controlling the deposit of a film of lubricant by reason of the wall thickness of the housing. The latter is accomplished since it is the wearing away of the housing that determines the rapidity with which lubricant is deposited on the flange.

Briefly, the invention concerns a railroad wheel flange lubricator. Such lubricator comprises in combination, a body of solid lubricant as well as a housing in tight gripping relationship with said body. The said housing has four side walls and an end wall. One of said side walls is adapted to extend on the outside of the wheel flange adjacent to the back face of the wheel rim to act as a guide. The two side walls adjacent to said guide side wall, are contoured at the open edge thereof, in order to fit the flange of the wheel. The width of said adjacent side walls is such that the body of lubricant straddles the flange only. The adjacent side walls and the remaining side wall of the housing, have predetermined thickness to control the rapidity of wear thereof. Consequently, the amount of deposit of lubricant on the flange is likewise controlled. There is a slot in each of said adjacent side walls located over the throat of the flange in order to cause a heavier deposit of lubricant on the throat. There is a permanent means on the outside of said housing for indicating proximity of the end of the useful life of the lubricator. And finally, there is means associated with said guide wall of the housing for supportably maintaining the lubricator in place over the flange of the wheel.

A preferred embodiment of the invention is described below and illustrated in the drawings in which:

Figure 1 is a perspective view illustrating the manner in which a lubricating shoe including its housing, may be maintained relative to the wheel;

Figure 2 is a plan view of the lubricating shoe including its mounting bracket;

Figure 3 is an end elevation of the lubricating shoe;

Figure 4 is a front elevation of the lubricating shoe with mounting bracket attached; and Figure 5 is a cross-section view taken along the lines 5—5 of Figure 4 looking in the direction of the arrows, with an outline of the edge or rim of a wheel shown in dashed lines.

Referring to Figure 1, it will be noted that the lubricating shoe according to this invention is most readily mounted for use at the top of the railroad wheel upon which it is being employed. Such mounting may take various forms including that illustrated wherein there is a sleeve shaped supporting member 11 that is adapted for being attached in any convenient manner, as by welding, to the truck frame (not shown); or to some other part of the vehicle support for the structure carried by the railroad wheels. It will be noted that there is illustrated a portion of a railroad wheel 12 which may be any one of the wheels employed on various vehicles that run on rails. It is contemplated, however, that the most useful application for a lubricator according to this invention is in connection with the driving wheels of a locomotive, most particularly a switch engine or similar type of locomotive.

It will be observed that the wheel 12 has the usual construction for railroad type wheels. This includes a flange portion 13 on the back edge of a rim portion 14 in the usual manner. It may be pointed out that wheels of this type, most particularly the driving wheels, should not have the characteristic of being in any way lubricated on the tread or rim portion 14 thereof. However, at the same time, the flange 13 of such a wheel tends to rub against the edge of the rail upon which the wheel is running, rather frequently at all times, and with more or less heavy pressure and wearing effect on curved track.

Also, heavy wear is encountered while passing over switches and frogs, etc. For this reason it is important that a flange lubricator apply lubrication to the flange, while preventing the application of any lubricant on the tread or rim portion of the wheel.

Continuing with a description of the support for the lubricant, it is pointed out that the bracket 11 carries pivotally therein a rod 16 that is bent at an angle for convenience of the mounting, and has threads 17 at the extremity thereof. The lubricating shoe itself is made up of a housing 18, that may be constructed of any relatively long wearing material having such weight as to provide a downward force for good rubbing contact with the flange 13 on the wheel 12. It is preferred to employ cast iron for housing 18 by reason of its characteristics, i.e. the weight and wearing characteristics are both satisfactory. The housing 18 is attached to its supporting rod 16 by means of the threads 17 at the end of the rod, in conjunction with a mounting plate or bracket 19. The plate 19 fastens securely onto the end of rod 16 by threadably engaging the threads 17 thereof (as clearly shown in Figure 2). Housing 18 is attached in turn to the plate 19, by means of a pair of bolts 20 and 21 with corresponding nuts 24 and 25. Bolts 20 and 21 pass through holes in the plate 19 as well as matching holes that may be drilled or otherwise formed in each of a pair of wing-like flanges 22 and 23. These wings 22 and 23 are integral with housing 18 and extend beyond the edges of a rear wall 28 of the housing 18. Wings 22 and 23 are integrally joined together across the width of rear wall 28 by means of a strip 29 that has a centrally located oblong opening 30 (Figures 4 and 5) that is located in line with the threaded end 17 of the support 16 to provide ample clearance therefor, should the end 17 extend beyond the inner surface of plate 19.

The housing 18 is made up of four side walls and an end wall 31. The side walls include the above mentioned rear wall 28, in addition to two adjacent side walls 32 and 33 as well as an opposite or front wall 34.

Contained within the housing 18 there is a block of solid lubricant 39 which may be any satisfactory solid lubricant. The block 39 of lubricant is press fitted into the housing 18 under relatively high pressure so that it is entirely fast within the housing and acts in a unitary manner therewith. Furthermore, by reason of thus pressing the block 39 into place, it cannot be dislodged under any normal conditions of use including the relatively rough handling and usage that this type of equipment gets.

It will be observed that each of the side walls 32 and 33 have slots or cut out openings 40 and 41, respectively. These slots are located near the front wall 34 and parallel thereto, so as to be directly over the throat of wheel flange 13 when the lubricator is in use. Thus as the lubricator wears down during its useful life there is a somewhat thicker deposit of the lubricant 39 upon the throat portion of the flange 13, because in the area of the open slots 40 and 41 the lubricant is not disturbed by the wearing action of the walls 32 and 33 against the wheel and flange. The throat portion referred to is the short radius curved surface which joins rim 14 with the front edge of the flange 13. In referring to the flange 13 herein, it is intended that the edge that is adjacent to the rim 14 upon which the wheel runs, shall be termed the front edge of the flange; while the back edge of the flange is that which extends radially from the back face of the wheel 12, i.e. that which normally lies on the inside edge of the rail upon which the wheel is running.

It will be noted that each of the side walls 32 and 33, in addition to having a slot or cut out opening has a rounded edge 42 and 43, respectively. The purpose of this rounded edge shape for each of the side walls 32 and 33 is merely that of providing a contour that approximates the outer cross-sectional contour of flange 13, so that the initial wear of the lubricator will be properly commenced.

In addition, it is to be noted that the thickness of the side walls 32, 33, and the front wall 34, are less than that of the rear wall 28. The purpose for this construction is to allow the normal wear of side walls 32, 33, and front wall 34, to determine the amount of lubrication that takes place as the wheel 12 rotates. It is to be noted that by determining the thickness of these three walls, i.e. side walls 32 and 33, as well as front wall 34, the rapidity with which this material wears away under given conditions, may be directly controlled.

By constructing the rear wall 28 of thicker or heavier material than the other three walls of the housing 18, the total weight of the lubricator may remain relatively constant in spite of the wear that takes place during the life of the lubricator. Thus the lubricating effect will not be extensively diminished as the end of the life of a given lubricator is reached.

Another function which rear wall 28 accomplishes is that of acting as a guide for the entire lubricator housing 18, to ensure against any of the lubricant being applied beyond the throat of the flange 13. In this regard, it will be noted that rear wall 28 does not receive any of the wear that takes place on the side walls 32 and 33, and the front wall 34. This is because rear wall 28 merely remains parallel to the back face of the wheel 12 and adjacent to the back edge of the flange 13; and during the course of the wearing down of the lubricator, it merely continues to extend downward beside the back face of the wheel 12, near the rim portion 14 thereof.

It will be noted that there is a raised boss 46 located near the top of each of the side walls 32 and 33. This boss 46 is placed on the housing in this manner to act as an indicator for showing when the lubricator is nearing the end of its useful life.

Operation

The operation of the lubricator 18 is relatively simple. It includes the fact that housing 18 is supported so as to hold the block of solid lubricant 39 straddling the flange 13 of the wheel 12. This position is maintained at all times, and by mounting the lubricator at the top of the wheel 12, it is not necessary to provide any spring bias for maintaining pressure contact between the lubricator and the flange 13. This is true, of course, by reason of the weight of the lubricator itself being employed to create the desired rubbing or pressure contact. When the lubricator is first mounted on a wheel, the block 39 of lubricant will have the configuration shown in Figure 3 wherein a notch 47 has been removed from the bottom of the block 39 to approximate the shape of the flange 13. Thus, excessive lubricant will be rapidly worn away during the initial stages, until the flange 13 makes contact directly with the side walls 32 and 33, and the front wall 34 contacts the tread of the wheel. From this time on, the deposit of lubricant on the flange 13 is closely controlled by the rapidity with which the three walls wear away.

While a specific embodiment of the invention has been set forth with considerable detail in accordance with the applicable statutes, this is not to be taken as in any way limiting the invention but merely as being descriptive thereof.

It is claimed:

1. A railroad wheel flange lubricator comprising in combination a body of solid lubricant, a housing in tight gripping relationship with said body, said housing having side walls and an end wall, one of said side walls being adapted to extend on the back side of the wheel flange to act as a guide, said side walls adjacent to said guide side wall having contours at the open edges thereof to fit the flange, one dimension of said adjacent side walls being such that the body of lubricant straddles the flange only, said adjacent side walls having a predetermined thickness to control the rapidity of wear thereof and consequently the amount of deposit of lubricant on the flange, a slot defined in each of said adjacent side walls located over the throat of the flange in order to cause a heavier deposit of lubricant on the throat of the flange and means for positioning the lubricator in flange straddling position and resting in contact with the flange.

2. A railroad wheel flange lubricator comprising in combination a body of solid lubricant, a housing in tight gripping relationship with said body, said housing having side walls and an end wall, one of said side walls being adapted to extend on the back side of the wheel flange to act as a guide, said side walls adjacent to said guide side wall having contours at the open edge thereof to fit the flange, said adjacent side walls having one dimension such that the body of lubricant straddles the flange only, said adjacent side walls having a predetermined thickness to control the rapidity of wear thereof and consequently the amount of deposit of lubricant on the flange, a slot in each of said adjacent side walls located over the throat of the flange in order to cause a heavier deposit of lubricant on the throat of the flange, means for positioning the lubricator in flange straddling position and in rubbing contact over a wheel flange, and permanent means on the outside of said housing for indicating proximity of the end of the useful life of the lubricator.

3. A railroad wheel flange lubricator adapted for mounting on adjacent structure which said wheel supports comprising an arm for supportably attaching said lubricator at the extremity thereof, means for pivotally supporting said arm on said adjacent structure, said lubricator including a body of solid lubricant, a housing in tight gripping relationship with said body, said housing having side walls and an end wall, one of said side walls being adapted to extend on the back side of the wheel flange to act as a guide, said housing having dimensions such that said body straddles the wheel flange only, said remaining side walls having predetermined thickness to govern the amount of deposit of the lubricant by determining the rapidity of wear of the housing material, and openings defined in said side walls at locations where it is desired to cause a heavier deposit of lubricant.

4. A railroad wheel flange lubricator adapted for mounting on adjacent structure which said wheel supports comprising an arm for supportably attaching said lubricator at the extremity thereof, means for pivotally supporting said arm on said adjacent structure, said lubricator including a body of solid lubricant, a housing in tight gripping relationship with said body, said housing having side walls and an end wall, one of said side walls being adapted to extend on the back side of the wheel flange to act as a guide, said side walls adjacent to said guide side wall having contours at the open edge thereof to fit the flange, said adjacent side walls having a dimension such that the body of lubricant straddles the flange only, said adjacent side walls having a predetermined thickness to control the rapidity of wear thereof and consequently the amount of deposit of lubricant on the flange, a slot in each of said adjacent side walls located over the throat of the flange in order to cause a heavier deposit of lubricant on the throat of the flange, and permanent means on the outside of said housing for indicating proximity of the end of the useful life of the lubricator.

5. A railroad wheel flange lubricator comprising in combination a body of solid lubricant, a housing in tight gripping relationship with said body, said housing having four side walls and an end wall, one of said side walls being adapted to extend on the back side of the wheel flange to act as a guide, the two side walls adjacent to said guide side wall having contours at the open edge thereof to fit the flange, the width of said adjacent side walls being such that the body of lubricant straddles the flange only, said adjacent side walls and the remaining side wall having a predetermined thickness to control the rapidity of wear thereof and consequently the amount of deposit of lubricant on the flange, a slot in each of said adjacent side walls located over the throat of the flange in order to cause a heavier deposit of lubricant on the throat of the flange, permanent means on the outside of said housing for indicating proximity of the end of the useful life of the lubricator, and means associated with said guide wall for supportably mounting the lubricator in place over the wheel flange.

6. A wheel flange lubricator comprising a body of lubricant which is applied by rubbing contact with the wheel flange, a housing for the lubricant having walls which are subject to wearing away when in rubbing contact with the flange, said walls defining open slots at those points where it is desired to apply a heavy deposit of said lubricant, the walls being of predetermined thickness for controlling the rapidity of their wearing away and consequently the amount of lubricant applied to the flange.

References Cited in the file of this patent

UNITED STATES PATENTS

| | | |
|---|---|---|
| 990,034 | Conniff | Apr. 18, 1911 |
| 1,027,559 | Miner | May 28, 1912 |
| 1,043,141 | Plymale | Nov. 5, 1912 |
| 1,279,345 | Hoofer | Sept. 17, 1918 |
| 1,635,602 | Black | July 12, 1927 |
| 1,748,028 | Rickard | Feb. 18, 1930 |
| 2,281,400 | Welby | Apr. 28, 1942 |
| 2,727,589 | Campney | Dec. 20, 1955 |